Dec. 16, 1969   H. U. LEFFERS ET AL   3,484,822
MOTOR COMPRESSOR ESPECIALLY FOR SMALL
REFRIGERATING MACHINES
Filed April 10, 1968

United States Patent Office 3,484,822
Patented Dec. 16, 1969

3,484,822
MOTOR COMPRESSOR ESPECIALLY FOR SMALL REFRIGERATING MACHINES
Hans Ulrik Leffers, Sonderborg, Knud Vagn Valbjorn, Nordborg, and Bent Melchior Karlsen Holme, Skovby, Denmark, assignors to Danfoss A/S, Nordborg, Denmark, a company of Denmark
Filed Apr. 10, 1968, Ser. No. 720,231
Int. Cl. F04b 9/04, 17/00
U.S. Cl. 230—58                                8 Claims

ABSTRACT OF THE DISCLOSURE

The invention relates to a motor compressor assembly of the type utilized for small refrigeration machines. The invention is directed to a shaft and bearing arrangement which allows the assembly to be performed efficiently and economically despite the fact that the bearings, including the crankshaft bearing, each has the form of a full annulus, as distinguished from a segment annulus.

---

Figure 1:
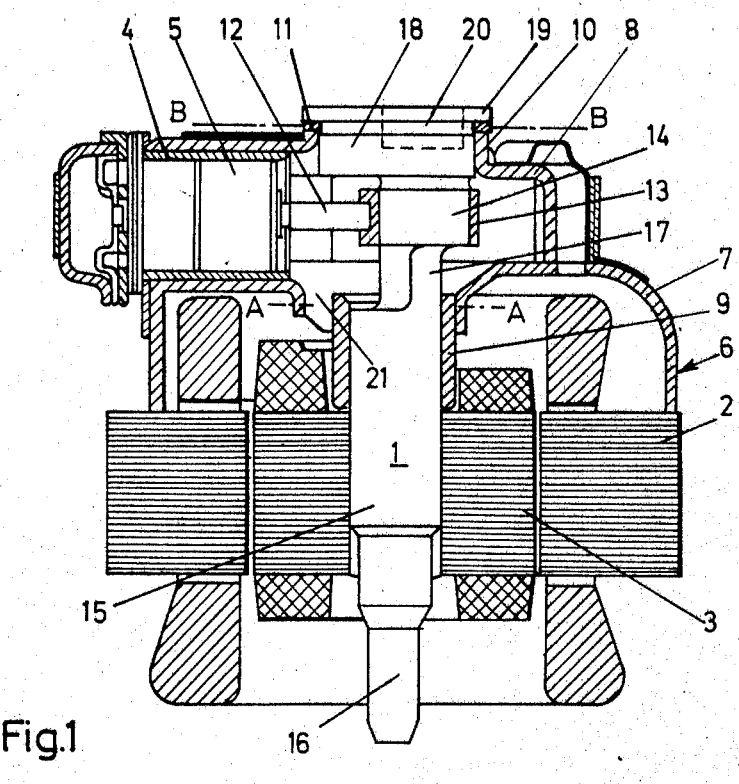

This invention relates to a motor compressor especially for small refrigerating machines, and having a housing firmly connecting two shaft bearings and a cylinder disposed between them. The housing can preferably be manufactured as a single piece, but may also be made up in a solid manner from several parts prior to assembly.

In motor compressors, the motor crankshaft must be held against axial displacement. It is known to provide that end of the motor portion of the shaft adjacent the crank journal with a flange, the side of which remote from the crank bears against the end face of the adjacent shaft bearing, so that an axial bearing results. The shaft can be held in the other axial direction by the rotor, bearing on the other end face of the shaft bearing. This design principle however meets with difficulties in the case of the above-mentioned construction of motr compressor, since the shaft must be inserted through one of the shaft bearings and thereby interferes with the flange projecting beyond the diameter of the shaft. The problem becomes more acute if it is desired to construct a motor compressor with a vertical shaft and a motor fitted underneath, since then the axial bearing must be designed as a pressure bearing which has to take up considerable forces and cannot therefore have a bearing surface less than a certain minimum. Also the use of an undivided connecting rod bearing is excluded in such circumstances.

The object of the invention is therefore to provide a motor compressor of the above-described kind, wherein, despite the use of undivided shaft bearings, neither the assembly of the motor crankshaft nor the fitting of a pressure bearing causes difficulties, and wherein it is even possible to employ an undivided connecting rod bearing.

The invention consists, in the case of a vertical shaft with a motor fitted at the bottom, in designing the upper shaft bearing also as a pressure bearing and providing the one-piece shaft with an upper bearing journal, which, due to an increase in diameter as compared with the rest of the shaft, has a step forming a pressure bearing face.

Since the pressure bearing face is located near the upper shaft bearing, it can be made as large as required without the operation of assembly being thereby impeded. Consequently, relatively small surface pressures can be achieved. Furthermore, the dimensions of the shaft are such that it can be introduced from above without difficulty. The rotor can then be pushed in from below and blocked on the shaft. Since the upper shaft bearing has an increased diameter due to the step formation, there results the further advantage that oil reaching the upper end of the motor crankshaft is flung at the relatively large circumference as far as the wall of the casing with corresponding centrifugal force and can cool there as it runs down. Here, it is immaterial whether the oil is excess oil, escaping at the end face of the motor shaft, or oil that has served for lubricating the upper shaft bearing and the pressure bearing.

It is particularly advantageous if the upper bearing journal has an exterior flange for forming the step, this flange constituting the surface of the pressure bearing. In this way, the surface of the pressure bearing can be made as wide as required whilst retaining a minimum dimension for the upper shaft journal. Also, an outer edge of large diameter is obtained which is better suited for flinging off the oil. Since this flange is located outside the bearing, it cannot interfere with the assembly operation either.

If provision is made for the radius of the bearing journal within the upper shaft bearing to be at least equal to the greatest distance between the periphery of the crank and the axis of the shaft, the shaft, including the crank journal, can be simply inserted from above into the correct position. Instead of this, there also exists the possibility of making the radius of the bearing journal within the upper shaft bearing smaller than the greatest distance betwen the periphery of the crank and the axis of the shaft, but for this purpose to provide the upper shaft bearing with a recess on the side facing the cylinder, for introducing the projecting part of the crank. The resultant weakening of the shaft bearing is of no consequence since only small forces have to be taken up on the side facing the piston. The weakening of the axial bearing is likewise of no consequence, because the remaining area can be made sufficiently large.

In a further form of the invention, an intermediate portion can be provided in known manner between the crank and the motor-side portion of the shaft, which intermediate portion lies within the cylindrical curves of the envelope of the crank and shaft portion and is at least of the same length as the crank bearing. The intermediate portion enables a one-piece crank bearing to be employed. Nevertheless, the one-piece shaft can be introduced from above into the two shaft bearings and the crank bearing. Since no axial bearing flange is necessary betwen the motor portion of the shaft and the crank, the intermediate portion can be provided here.

The upper bearing journal can thus be directly adjacent the crank. This results in a desirable shortening of the length of the shaft and in a greater rigidity.

Also, the upper bearing journal can have a recess on the outside near the crank. The bearing journal then has its weight distributed eccentrically and serves as a counterweight to the crank.

When inserting the motor crankshaft it is expedient to support the crank bearing in the correct position by means of an auxiliary tool. With a largely completely enclosed crank housing this is best achieved by providing, in the housing wall carrying the lower shaft bearing and below the connecting rod, an opening preferably near the bearing for inserting a holding device for the connecting rod during the assembly operation.

It is thus expedient for the pressure bearing to have a bearing ring connected by its end face to the upper friction bearing. This improves the load-carrying properties of the pressure bearing. The ring can be simply pressed onto the end-face cross-sectional face of the upper shaft bearing and soldered in that position.

Figure 2:
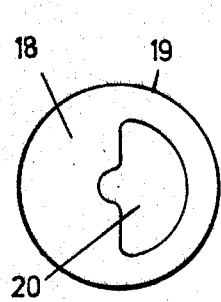
Figure 3:
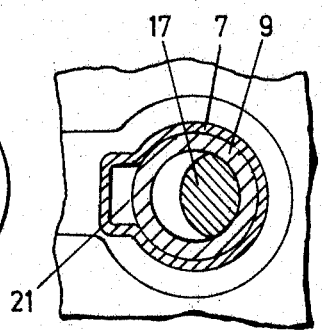
Figure 4:
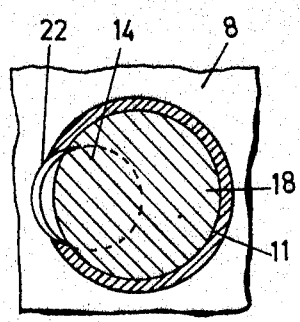

The invention will now be explained in greater detail by reference to an embodiment illustrated in the drawing, wherein:

FIG. 1 shows a longitudinal section including the important parts of the motor compressor according to the invention, FIG. 2 is a plan view of the motor crankshaft, FIG. 3 is a section on the line A—A of FIG. 1, and FIG. 4 is a part section through a further embodiment to the level of line B—B of FIG. 1.

The motor compressor has a vertical motor crankshaft 1 with a motor disposed below consisting of a stator 2 and a rotor 3, and a compressor disposed at the top and consisting of a cyinder 4 and a piston 5. A supporting member 6 with a lower sheet-metal part 7 and an upper sheet-metal part 8 soldered thereto connects the stator 2 to the cyinder 4. The supporting member 6 also carries a lower shaft bearing 9 and has an extension which forms an upper shaft bearing 10. The end face of the latter is provided with a ring 11 of bearing metal. The piston 5 is flexibly connected to a connecting rod 12 which is driven by the crank 14 of the shaft 1 through a crank bearing ring 13.

The shaft 1 consists of a lower cylindrical portion 15 followed at its lower end by an oil-supply device 16 containing a conical cavity. The portion 15 is connected to the crank 14 by way of an intermediate portion 17. As can be seen from FIG. 3, the intermediate portion lies within the cylindrical curves of the envelope of the crank 14 and the shaft portion 15. It is of a somewhat greater length than the crank bearing ring 13. Immediately adjacent the crank 14 is an upper shaft journal 18 which terminates in a flange 19. The shaft journal 18 is mounted in the shaft bearing 10. The underface of the flange 19 rests upon the bearing ring 11 of the pressure bearing. The dimensions of the shaft journal 18 are such that it projects beyond the greatest distance between the periphery of the crank journal and the axis of the shaft. It contains a recess 20 the form of which can be seen from FIG. 2, so that the shaft journal 18 constitutes a counter weight to the crank journal 14.

The sheet-metal part 7 has in its middle a key-hole shaped orifice of such form that after insertion of the bearing 9 there still remains an opening 21 (FIG. 3). Through this opening can be introduced, from below, a holding device which, during the assembly operation, holds the connecting rod 12 and thus the crank bearing ring 13 in the correct position.

Other details of the compressor, such as valves, cylinder head, noise-reducing chambers, casing etc., are only indicated or not illustrated at all, since they are not necessary to an understanding of the invention.

For the purpose of assembly, the parts of the motor compressor 6, the bearing 9 and the cylinder 4 are joined together, for example by soldering. The piston 5 together with the connecting rod 12 and the crank bearing ring 13 are then introduced into the cylinder 4 from the outside. The connecting rod 12 is held in position in such manner by the holding device introduced through the opening 21 that the bearing 13 is positioned above the bearing 9. The shaft 1 can then be pushed in from above. When the intermediate portion 17 is in a position at the level of the crank bearing ring 13, the latter is displaced sideways into the projection of the crank journal 14. The shaft 1 is then lowered to the fullest extent. The rotor 3 can then be pushed over from below. Finally, the stator 2 is secured to the supporting member 6.

In the embodiment shown in FIG. 4, a recess 22 is provided in the upper shaft bearing 10 and in a ring 11 of the axial bearing, which recess extends beyond the inside diameter of the shaft bearing 10. The recess 22 is located on the side facing the cylinder 4 and is of such form that the crank journal 14, which in this case projects beyond the diameter of the upper bearing journal 18, can be passed through by its projecting part.

What is claimed is:

1. A motor-compressor comprising a housing defining a cylinder, bearing means fixedly associated with said housing forming upper and lower axially aligned and spaced radial thrust bearing surfaces with said upper surface being radially larger than said lower surface, a shaft having stepped portions journalled by said radial thrust bearing surfaces, said cylinder having the axis thereof extending transversely of the axis of rotation of said shaft and between said radial thrust bearing surfaces, said bearing means including an annularly shaped axial thrust bearig surface above said upper radial thrust bearing surface, said shaft having an annular flange portion rotatably supported by said axial thrust bearing surface.

2. A motor-compressor assembly according to claim 1 wherein said shaft has a crank portion eccentrically disposed relative to the axis of rotation of said shaft, said crank portion being within the circumferential confine of said upper radial thrust bearing surface.

3. A motor-compressor assembly according to claim 2, a connecting rod having a crank bearing, said shaft crank portion being journalled in said crank bearing, said upper radial thrust bearing surface having a radius smaller than the combined distances of the inside radius of said crank bearing plus the eccentricity of said shaft crank portion, said upper radial thrust bearing surface being recessed to provide clearance for said shaft crank portion.

4. A motor-compressor assembly according to claim 2 wherein a portion of said shaft between said shaft crank portion and said lower radial thrust bearing surface is within the circumferential confine of said shaft crank portion.

5. A motor-compressor assembly according to claim 2 wherein said shaft crank portion is immediately adjacent said upper radial thrust bearing surface.

6. A motor-compressor assembly according to claim 2 wherein a portion of said shaft above said shaft crank portion is recessed to provide radial balancing relative to the axis of rotation of said shaft.

7. A motor-compressor assembly according to claim 3 wherein said housing defines an opening adjacent said lower radial thrust bearing surface to effect the entrance of a tool during assembly installation of said connecting rod.

8. A motor-compressor assembly according to claim 1 wherein said axial thrust bearing surface forms the upper surface for a ring shaped member, said ring shaped member being above and adjacent to said upper radial thrust bearing surface.

References Cited

UNITED STATES PATENTS

| | | | |
|---|---|---|---|
| 2,767,903 | 10/1956 | Warner | 230—58 |
| 3,044,682 | 7/1962 | Weibel et al. | 230—58 |

ROBERT M. WALKER, Primary Examiner